United States Patent
Doi et al.

(10) Patent No.: US 12,528,708 B2
(45) Date of Patent: Jan. 20, 2026

(54) LITHIUM-CONTAINING OXIDE, AND METHOD FOR PREPARING SOLID ELECTROLYTE

(71) Applicants: SUMITOMO CHEMICAL COMPANY, LIMITED, Tokyo (JP); Kyoto University, Kyoto (JP)

(72) Inventors: Atsunori Doi, Niihama (JP); Hiroshi Kageyama, Kyoto (JP); Cedric Tassel, Kyoto (JP)

(73) Assignees: SUMITOMO CHEMICAL COMPANY, LIMITED, Tokyo (JP); Kyoto University, Kyoto (JP)

( * ) Notice: Subject to any disclaimer, the term of this patent is extended or adjusted under 35 U.S.C. 154(b) by 0 days.

(21) Appl. No.: 18/565,525

(22) PCT Filed: Jun. 1, 2022

(86) PCT No.: PCT/JP2022/022361
§ 371 (c)(1),
(2) Date: Nov. 30, 2023

(87) PCT Pub. No.: WO2022/255413
PCT Pub. Date: Dec. 8, 2022

(65) Prior Publication Data
US 2024/0239676 A1 Jul. 18, 2024

(30) Foreign Application Priority Data
Jun. 2, 2021 (JP) ................. 2021-093168

(51) Int. Cl.
*H01B 1/08* (2006.01)
*C01D 15/02* (2006.01)
*H01M 10/00* (2006.01)

(52) U.S. Cl.
CPC ............. *C01D 15/02* (2013.01); *H01B 1/08* (2013.01); *C01P 2002/30* (2013.01); *C01P 2002/70* (2013.01); *C01P 2002/86* (2013.01); *C01P 2006/40* (2013.01); *C01P 2006/80* (2013.01)

(58) Field of Classification Search
CPC ........... H01B 1/00; H01B 1/08; C01D 15/02; H01M 10/0562
See application file for complete search history.

(56) References Cited

U.S. PATENT DOCUMENTS 10,826,116 B2 * 11/2020 Yamamoto ............... H01B 1/08
11,258,094 B2 * 2/2022 Yamamoto ............ H01M 6/187
2015/0118571 A1 4/2015 Liu et al.
2020/0168946 A1 5/2020 Yamamoto et al.
2020/0194830 A1 6/2020 Yamamoto
2023/0187687 A1 * 6/2023 Bertry ............... H01M 10/0562
  429/323

FOREIGN PATENT DOCUMENTS

| | | |
|---|---|---|
| CN | 102780028 A | 11/2012 |
| CN | 102780031 A | 11/2012 |
| CN | 102867987 A | 1/2013 |
| CN | 102867988 A | 1/2013 |
| CN | 104591231 A | 5/2015 |
| EP | 3703170 A1 * | 9/2020 ............. C01F 11/00 |
| JP | 2020-087770 A | 6/2020 |
| WO | 2015/065879 A1 | 5/2015 |
| WO | 2015/079509 A1 | 6/2015 |
| WO | 2019/090360 A1 | 5/2019 |
| WO | 2021/219806 A1 | 11/2021 |

OTHER PUBLICATIONS

Zagorski et al "Garnet-Polymer Composite Electrolytes: New Insights on Local Li- Ion Dynamics and Electrodeposition Stability with Li Metal Anodes", ACS Appl. Energy Mater. 2019, 2, 1734-1746.*
English Translation of International Preliminary Report on Patentability received in PCT Application No. PCT/JP2022/022361, dated Dec. 14, 2023.
English Translation of International Search Report received in PCT Application No. PCT/JP2022/022361, dated Jul. 5, 2022.
Liu Cai et al., "High Ion Conductivity in Garnet-type F-doped Li7La3Zr2O12", Journal of Inorganic Materials, 2015 (vol. 30 No. 9), p. 995-p. 1000.
Yao Lu et al., "Effects of Fluorine Doping on Structural and Electrochemical Properties of Li6.25Ga0.25La3Zr2O12 as Electrolytes for Solid-State Lithium Batteries", ACS Appl. Mater. Interfaces, 2019 (11), p. 2042-p. 2049.
Stephen R. Yeandel et al., "Structure and Lithium-Ion Dynamicsin Fluoride-Doped Cubic Li7La3Zr2O12(LLZO) Garnet for Li Solid-State Battery Applications", J. Phys. Chem. C, 2018 (122), p. 27811-p. 27819.
Qiuying Li et al., "Investigation the electrochemical properties of LiCl-LiBr-LiF-doped Li7La3Zr2O12 electrolyte for lithium thermal batteries", Ionics, 2020 (26), p. 3875-p. 3882.
Office Action received in corresponding Japanese Patent Application No. 2021-093168, dated Jun. 28, 2022.
Dong Bo et al, "Halogenation of Li7La3Zr2O12 solid electrolytes: a combined solid-state NMR, computational and electrochemical study", Journal of Materials Chemistry A, vol. 10, No. 20 DOI: 10.1039/D1TA07309E, Jan. 1, 2022, p. 11172-p. 11185, XP093304703.

* cited by examiner

*Primary Examiner* — Mark Kopec
(74) *Attorney, Agent, or Firm* — Rimon P.C.

(57) ABSTRACT

A lithium-containing oxide having a cubic garnet structure and wherein, when a solid-state $^{19}$F-NMR spectrum is measured under conditions where a $^{19}$F nucleus resonance frequency is 564 MHz, at least one peak is observed within a chemical shift range of −100 to 50 ppm, based on a chemical shift of polytetrafluoroethylene being −122 ppm.

6 Claims, No Drawings

LITHIUM-CONTAINING OXIDE, AND METHOD FOR PREPARING SOLID ELECTROLYTE

CROSS-REFERENCE TO RELATED APPLICATIONS

This application is the U.S. National Phase under 35 U.S.C. § 371 of International Application No. PCT/JP2022/022361, filed on Jun. 1, 2022, which claims the benefit of foreign priority to JP Patent Application No. 2021-093168 filed on Jun. 2, 2021, the entire contents of each of which are hereby incorporated by reference.

TECHNICAL FIELD

The present disclosure relates to a lithium-containing oxide and a method for preparing a solid electrolyte.

BACKGROUND ART

In recent years, solid electrolytes have been actively studied in various fields as, for example, ion-conducting materials. Particularly, lithium-containing oxides such as $Li_7La_3Zr_2O_{12}$ (LLZO) have received particular attention because they are useful as solid electrolyte layers in lithium ion batteries (Patent Literature 1 to 7, Non-Patent Literature 1 to 4). All-solid-state batteries in which the electrolyte in the battery is replaced with a solid electrolyte in place of a conventional electrolytic solution have many advantages such as that they have a high capacity and can be rapidly charged and discharged because they do not use a solvent, they are safe because they are flame retardant and there is no decomposition of the solvent, and the pack energy density can be improved because they have high temperature durability and cooling facilities are not necessary.

CITATION LIST

Patent Literature

[Patent Literature 1] PCT International Publication No. WO 2015/065879
[Patent Literature 2] Japanese Unexamined Patent Application Publication No. 2020-087770
[Patent Literature 3] PCT International Publication No. WO 2015/079509
[Patent Literature 4] Chinese Patent Application Publication No. 102780028
[Patent Literature 5] Chinese Patent Application Publication No. 102780031
[Patent Literature 6] Chinese Patent Application Publication No. 102867987
[Patent Literature 7] Chinese Patent Application Publication No. 102867988

Non-Patent Literature

[Non-Patent Literature 1] LIU Cai et al., "High Ion Conductivity in Garnet-type F-doped $Li_7La_3Zr_2O_{12}$", Journal of Inorganic Materials, Vol. 30 No. 9, p 995-1000, September, 2015.
[Non-Patent Literature 2] Yao Lu et al., "Effects of Fluorine Doping on Structural and Electrochemical Properties of $Li_{6.25}Ga_{0.25}La_3Zr_2O_{12}$ as Electrolytes for Solid-State Lithium Batteries", ACS Appl. Mater. Interfaces 2019, 11, p 2042-2049.
[Non-Patent Literature 3] Stephen R. Yeandel et al., "Structure and Lithium-Ion Dynamics in Fluoride-Doped Cubic $Li_7La_3Zr_2O_{12}$ (LLZO) Garnet for Li Solid-State Battery Applications", J. Phys. Chem. C 2018, 122, p 27811-27819.
[Non-Patent Literature 4] Qiuying Li et al., "Investigation the electrochemical properties of LiCl—LiBr—LiF-doped $Li_7La_3Zr_2O_{12}$ electrolyte for lithium thermal batteries", Ionics (2020), 26, p 3875-3882.

SUMMARY OF INVENTION

Technical Problem

However, conventional solid electrolytes still have room for improvement in ion conductivity.

The present disclosure has been made in view of the above circumstances, and an object of the present disclosure is to provide a lithium-containing oxide having excellent ion conductivity. In addition, an object of the present disclosure is to provide a method for preparing a solid electrolyte having excellent ion conductivity.

Solution to Problem

A lithium-containing oxide of the present disclosure has a cubic garnet structure and wherein, when a solid-state $^{19}$F-NMR spectrum is measured under conditions where a $^{19}$F nucleus resonance frequency is 564 MHz, at least one peak is observed within a chemical shift range of −100 to 50 ppm, based on a chemical shift of polytetrafluoroethylene being −122 ppm. In the lithium-containing oxide, preferably, when a solid-state $^6$Li-NMR spectrum is measured under conditions where a $^6$Li nucleus resonance frequency is 44.1 MHz, at least one peak is observed within a chemical shift range of −5 to 15 ppm, based on a chemical shift of a 1 mol/L LiCl aqueous solution being 1.19 ppm.

A lithium-containing oxide of the present disclosure contains fluorine atoms and has a cubic garnet structure, wherein, when a solid-state $^6$Li-NMR spectrum is measured under conditions where a $^6$Li nucleus resonance frequency is 44.1 MHZ, at least two peaks may be observed within a chemical shift range of −5 to 15 ppm, based on a chemical shift of a 1 mol/L LiCl aqueous solution being 1.19 ppm. In the lithium-containing oxide, preferably, when a solid-state $^{19}$F-NMR spectrum is measured under conditions where a $^{19}$F nucleus resonance frequency is 564 MHz, at least one peak is observed within a chemical shift range of −100 to 50 ppm, based on a chemical shift of polytetrafluoroethylene being −122 ppm.

In the lithium-containing oxide of the present disclosure, preferably, when a solid-state $^6$Li-NMR spectrum is measured under conditions where a $^6$Li nucleus resonance frequency is 44.1 MHz, at least two peaks having a half maximum full-width of 2 ppm or less are observed within a chemical shift range of −5 to 15 ppm, based on a chemical shift of a 1 mol/L LiCl aqueous solution being 1.19 ppm.

In the lithium-containing oxide of the present disclosure, preferably, when a solid-state $^6$Li-NMR spectrum is measured under conditions where a $^6$Li nucleus resonance frequency is 44.1 MHz, two peaks are observed within a chemical shift range of −5 to 15 ppm, based on a chemical shift of a 1 mol/L LiCl aqueous solution being 1.19 ppm, and a ratio of an area intensity of the peak having the smaller area intensity to the sum of area intensities of the two peaks is 0.3% or more.

In the lithium-containing oxide of the present disclosure, regarding a ratio of the numbers of atoms measured through ICP emission spectroscopy, when La is 3, preferably, Li is 6 to 12, and Zr is 1 to 3.

In the lithium-containing oxide of the present disclosure, in a powder X-ray diffraction chart, a peak intensity at 28.5 to 29.0° to a peak intensity at 16.0 to 17.0° is preferably 0.5 or less.

A sintered product of the present disclosure includes the lithium-containing oxide.

An electrolyte composition of the present disclosure includes the lithium-containing oxide.

A method for preparing a solid electrolyte of the present disclosure includes a step of performing a topotactic reaction on a lithium-containing oxide.

Preferably, the topotactic reaction is performed at a temperature of 900° C. or lower.

Preferably, according to the topotactic reaction, anions are introduced into the lithium-containing oxide, and the anions include at least one element selected from the group consisting of a halogen, chalcogen, nitrogen and phosphorus.

In the topotactic reaction, preferably, the lithium-containing oxide and a metal fluoride are reacted.

Preferably, the metal fluoride is at least one of $GaF_3$, $MgF_2$, $NiF_2$ and $ZnF_2$.

Preferably, the solid electrolyte has a garnet structure.

Advantageous Effects of Invention

According to the present disclosure, it is possible to provide a lithium-containing oxide having excellent ion conductivity. In addition, according to the present disclosure, it is possible to provide a method for preparing a solid electrolyte having excellent ion conductivity.

DESCRIPTION OF EMBODIMENTS

<Lithium-Containing Oxide>

A lithium-containing oxide of the present embodiment contains fluorine atoms and has a cubic garnet structure, and satisfies at least one of the following condition (1) and condition (2).

condition (1): when a solid-state $^{19}F$-NMR spectrum is measured under conditions where a $^{19}F$ nucleus resonance frequency is 564 MHz, at least one peak is observed within a chemical shift range of −100 to 50 ppm, based on a chemical shift of polytetrafluoroethylene being −122 ppm.

condition (2): when a solid-state $^6Li$-NMR spectrum is measured under conditions where a $^6Li$ nucleus resonance frequency is 44.1 MHz, at least two peaks are observed within a chemical shift range of −5 to 15 ppm, based on a chemical shift of a 1 mol/L LiCl aqueous solution being 1.19 ppm.

In addition, in the condition (1), the peak of polytetrafluoroethylene which serves as a reference for chemical shift is a peak belonging to the fluorine atom of the —$CF_2$—$CF_2$- unit.

Such a lithium-containing oxide has excellent ion conductivity (lithium ion conductivity). Here, it should be noted that the peaks referred to in the conditions (1) and (2) are NMR resonance peaks, and do not include spinning sidebands. Here, in the following, the chemical shift in the solid-state $^{19}F$-NMR spectrum is a chemical shift measured under conditions where a $^{19}F$ nucleus resonance frequency is 564 MHz, based on a chemical shift of polytetrafluoroethylene being −122 ppm. In addition, the chemical shift in the solid-state $^6Li$-NMR spectrum is a chemical shift measured under conditions where a $^6Li$ nucleus resonance frequency is 44.1 MHz, based on a chemical shift of a 1 mol/L LiCl aqueous solution being 1.19 ppm. In addition, other measurement conditions for the solid-state $^{19}F$-NMR spectrum and the solid-state $^6Li$-NMR spectrum include, for example, measurement conditions in examples.

The reason why the lithium-containing oxide has excellent lithium ion conductivity is not necessarily clear, but the inventors speculated the reason as follows.

First, regarding the condition (1), in the solid-state $^{19}F$-NMR spectrum of a conventional lithium-containing oxide having a garnet structure containing fluorine (for example, Comparative Examples 2 and 3), no peak is observed in the chemical shift range of −100 to 50 ppm. Therefore, it can be said that at least some fluorine atoms contained in the lithium-containing oxide of the present embodiment remain in the compound in an environment different from that of fluorine atoms in conventional lithium-containing oxides containing fluorine. This is thought to locally affect the crystal structure and charging state of the lithium-containing oxide, and affect distribution or mobility of lithium ions in the compound.

In addition, regarding the condition (2), in the solid-state $^6Li$-NMR spectrum of a conventional lithium-containing oxide (for example, Comparative Example 3), only a single peak is observed within a chemical shift range of −5 to 15 ppm. Therefore, it can be said that a lithium-containing oxide that satisfies the condition (2) contains lithium ions remaining in an environment different from that of conventional lithium-containing oxides. Since such lithium ions have high mobility, they move easily when a voltage is applied, and are thought to contribute to improvement of lithium ion conductivity.

In the lithium oxide that satisfies the condition (1) or (2), improvement in lithium ion conductivity is observed when a crystal system is cubic. On the other hand, for example, in the case of crystal systems other than a cubic system such as a tetragonal system, even if the condition (1) or (2) is satisfied, no improvement in lithium ion conductivity is observed.

Regarding the condition (1), when the solid-state $^{19}F$-NMR spectrum of the lithium-containing oxide is measured, it is preferable that at least one peak be observed in a range of −75 to 25 ppm, it is more preferable that at least one peak be observed in a range of −50 to 0 ppm, and it is still more preferable that at least one peak be observed in a range of −30 to −10 ppm. The number of peaks within these chemical shift ranges is preferably 5 or less, more preferably 3 or less, still more preferably 1 or 2, and particularly preferably 1.

Regarding the condition (2), when the solid-state $^6Li$-NMR spectrum of the lithium-containing oxide is measured, it is preferable that at least two peaks be observed in a range of −3 to 12 ppm, it is more preferable that at least two peaks be observed in a range of 0 to 10 ppm, and it is still more preferable that at least two peaks be observed in a range of 1.35 to 5 ppm. The number of peaks within these chemical shift ranges is preferably 5 or less, more preferably 3 or less, and still more preferably 2. In addition, within these chemical shift ranges, at least two peaks having a half maximum full-width of 2 ppm or less may be observed.

When a peak having the maximum area intensity among the peaks observed within the chemical shift range in the condition (2) is set as a first peak, a ratio of the sum of area intensities of peaks other than the first peak to the sum of area intensities of peaks observed within the chemical shift range in the condition (2) is preferably 0.3% or more, more preferably 0.5 to 20%, still more preferably 0.7 to 15%, and particularly preferably 1.0 to 12%. When only two peaks are observed within the chemical shift range in the condition (2), if the peak having the smaller area intensity is set as a second peak, the ratio of the area intensity of the second peak to the sum of area intensities of the first peak and the second peak is preferably within the above range. The first peak may be a peak derived from lithium that occupies 48 g lithium sites. Regarding the condition (2), at least one of the observed peaks is preferably observed in a range of −2 to 2.3 ppm, more preferably observed in a range of 0 to 2 ppm, and still more preferably observed in a range of 1.35 to 2 ppm. In addition, regarding the condition (2), at least one of the observed peaks preferably has a half maximum full-width of 1.3 ppm or less and more preferably has a half maximum full-width of 1 ppm or less. It is preferable that the second peak be observed in a range of −2 to 2.3 ppm and have a half maximum full-width of 1.3 ppm or less, and it is more preferable that the second peak be observed in a range of 1.35 to 2 ppm and have a half maximum full-width of 1 ppm or less.

Although the effects of the present disclosure are exhibited even if only one of the conditions (1) and (2) is satisfied, it is more preferable that both the conditions (1) and (2) be satisfied. When the condition (1) is satisfied, in the solid-state $^6$Li-NMR spectrum of the lithium-containing oxide, when the chemical shift of lithium fluoride is 0 ppm, at least one peak may be observed within a chemical shift range of −5 to 15 ppm, it is preferable that at least one peak be observed in a range of −3 to 12 ppm, and it is more preferable that at least one peak be observed in a range of 0 to 10 ppm. The number of peaks within these chemical shift ranges is preferably 5 or less, more preferably 3 or less, still more preferably 1 or 2, and particularly preferably 1. In addition, the peaks within these chemical shift ranges may include a peak derived from lithium that occupies 48 g lithium sites.

The lithium-containing oxide of the present embodiment is not particularly limited, and is preferably a lithium-containing oxide containing La and Zr. In such a lithium-containing oxide, regarding a ratio of the numbers of Li, La and Zr atoms, when La is 3, it is preferable that Li be 5 to 12, and Zr be 1 to 3, and it is more preferable that Li be 6 to 8, and Zr be 1 to 2.5. The ratio of the numbers of Li, La and Zr atoms in the lithium-containing oxide can be measured through, for example, ICP emission spectroscopy.

The lithium-containing oxide of the present embodiment contains La and Zr, and may further contain metal elements other than Li, La and Zr. Examples of such metal elements include alkaline earth metals such as Mg, Ca, and Sr, and metal elements such as Ga, Ta, Nb, and Y. When the number of La atoms is 3, the proportion of the numbers of alkaline earth metal atoms in the lithium-containing oxide may be 0.2 or less or 0.01 to 0.15. When the number of La atoms is 3, the proportion of the number of Ta atoms in the lithium-containing oxide may be 0.01 to 1 or less or 0.05 to 0.6. When the number of La atoms is 3, the proportion of the number of Ga atoms in the lithium-containing oxide may be 0.01 to 1 or less or 0.1 to 0.6. The lithium-containing oxide of the present embodiment may contain a halogen element other than fluorine, and the content of halogen atoms other than fluorine with respect to 100 mol % of fluorine atoms may be 150 mol % or less, 100 mol % or less, or 50 mol % or less.

The ratio of the numbers of atoms in the lithium-containing oxide can be measured through, for example, inductively coupled plasma (ICP) emission spectroscopy.

The fact that the lithium-containing oxide of the present embodiment has a cubic crystal structure can be confirmed according to, for example, powder x-ray diffraction measurement. In addition, when the lithium-containing oxide of the present embodiment is subjected to powder x-ray diffraction measurement using CuKα rays, in the powder X-ray diffraction chart, with respect to the peak intensity at 16.0 to 17.0°, the peak intensity at 28.5 to 29.0° is preferably 0.5 or less, and may be 0.3 or less, 0.15 or less, or 0.1 or less. Here, the peak intensity at each peak means the maximum value of each peak in the diffraction chart. It is thought that the peak at 28.5 to 29.0° represents $La_2Zr_2O_7$ and a compound having a similar chemical structure. Such a compound is an impurity that does not contribute to lithium ion conductivity, and the content thereof is preferably small, and more preferably, the compound is not detected within a measurement limit range.

Since the lithium-containing oxide of the present embodiment has excellent lithium ion conductivity, it is suitable as an ion-conducting material, and can be used, for example, in a solid electrolyte of a lithium ion battery.

The shape of the lithium-containing oxide of the present embodiment is not particularly limited, and the oxide may be in the form of a powder or shaped into a pellet form. In addition, the oxide may be a sintered product obtained by sintering powders or may be a bonded component obtained by bonding powders with a binding agent. In addition, the oxide can be mixed with other component and used as a composition. Examples of such a composition include an electrolyte composition for use as a solid electrolyte in a lithium ion battery and the like. The electrolyte composition may contain an ion-conducting material, an ion liquid, a polymer material and the like as components other than the lithium-containing oxide.

<Lithium Ion Battery>

The lithium-containing oxide of the present embodiment is useful as a solid electrolyte in a lithium ion battery (all-solid-state battery). The lithium ion battery may be either a primary battery or a secondary battery. When the lithium-containing oxide of the present embodiment is used as a solid electrolyte, since no solvent is required, the potential window of the solid electrolyte is wide, and not only known materials for a positive electrode or a negative electrode of a lithium ion battery using a conventional electrolytic solution but also electrodes with a higher potential can be used.

The positive electrode of the lithium ion battery is not particularly limited, and contains a positive electrode active material and as necessary, may contain a conductive aid, a binding agent and the like. The positive electrode may be one in which a layer containing these materials is formed on a current collector. Examples of positive electrode active materials include a lithium-containing composite metal oxide containing lithium (Li), and at least one transition metal selected from the group consisting of V, Cr, Mn, Fe, Co, Ni, and Cu. Examples of such lithium composite metal oxides include $LiCoO_2$, $LiNiO_2$, $LiMn_2O_4$, $Li_2Mn_2O_3$, $LiNi_xMn_yCo_{1-x-y}O_2[0<x+y<1]$), $LiNi_xCo_yAl_{1-x-y}O_2[0<x+y<1]$), $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$.

The negative electrode of the lithium ion battery is not particularly limited, and may contain a negative electrode active material and as necessary, a conductive aid, a binding agent and the like. The negative electrode may be one in which a layer containing these materials is formed on a current collector. Examples of negative electrode active materials include anatase phases and rutile phases of $Nb_2O_5$, $V_2O_5$, $TiO_2$, $In_2O_3$, ZnO, $SnO_2$, NiO, ITO (Indium Tin Oxide), AZO (Al-doped Zinc Oxide), FTO (F-doped Tin Oxide), and $TiO_2$, lithium composite metal oxides such as $Li_4Ti_5O_{12}$ and $Li_2T_{13}O_7$, metals such as Li, Si, Sn, Si—Mn, Si—Co, Si—Ni, In, and Au and alloys containing these metals, carbon materials such as graphite, and substances in which lithium ions are inserted between the carbon material layers.

The material of the current collector is not particularly limited, and may be a simple substance such as Cu, Mg, Ti, Fe, Co, Ni, Zn, Al, Ge, In, Au, Pt, Ag, or Pd, or an alloy thereof.

<Method for Preparing Solid Electrolyte>

A method for preparing a solid electrolyte of the present embodiment includes a step of performing a topotactic reaction on a lithium-containing oxide.

The method for preparing a solid electrolyte of the present embodiment is also a method suitable for preparing the lithium-containing oxide of the present embodiment.

Here, the topotactic reaction is a reaction in which elements contained in a dopant are introduced as chemical species such as anions into a lithium-containing oxide while the basic framework of the host lithium-containing oxide is maintained. The chemical species introduced into the lithium-containing oxide may be replaced with some atoms or atom groups of the lithium-containing oxide or may be inserted into the structure of the lithium-containing oxide. Anions may be introduced into the lithium-containing oxide according to the topotactic reaction, and the anions may be replaced with some anions contained in the lithium-containing oxide.

The crystal structure as the basic framework is not particularly limited, and a crystal structure such as a garnet type crystal structure, a perovskite type crystal structure, a lamellar rock salt type structure, a NASICON type crystal structure, a LISICON type crystal structure, or an olivine type crystal structure may be used or an amorphous structure may be used. Particularly, it is preferable to have a crystal structure such as a garnet type crystal structure, a perovskite type crystal structure, a lamellar rock salt type structure, a NASICON type crystal structure, a LISICON type crystal structure, or an olivine type crystal structure.

The topotactic reaction is performed preferably at 900° C. or lower, more preferably at 50 to 800° C., still more preferably at 100 to 700° C., yet more preferably at 150 to 600° C., and particularly preferably at 200 to 500° C. The time for which the topotactic reaction is performed is not particularly limited, and may be, for example, 30 minutes to 48 hours, or 5 to 36 hours.

The lithium-containing oxide may contain an element other than lithium element. Examples of elements other than lithium element include alkali metals, alkaline earth metal elements, rare earth elements, transition metal elements, chalcogens, halogens, elements in Group 15 (nitrogen group) in the periodic table, elements in Group 14 (carbon group) in the periodic table, and elements in Group 13 (boron group) in the periodic table. Here, in this specification, the transition metal elements are elements in Group 4 to Group 12 in the periodic table. That is, the term "transition metal element" includes the zinc group.

The alkali metal may be at least one selected from the group consisting of Na, K, Rb, and Cs, may be at least one selected from the group consisting of Na and K, and may be Na.

The alkaline earth metal element may be at least one selected from the group consisting of Be, Mg, Ca, Sr, and Ba, may be at least one selected from the group consisting of Mg, Ca, and Sr, and may be Sr.

The rare earth element may be Sc, Y or a lanthanoid, and may be at least one selected from the group consisting of Sc, Y, La and Nd.

The transition metal element may be a transition metal element in the fourth period to the sixth period in the periodic table and may be at least one selected from the group consisting of Zr, Ta, Ti, V, Sb and Nb, and may be at least one selected from the group consisting of Zr, Ta, and Nb.

The chalcogen may be at least one selected from the group consisting of O, S, Se, and Te, and may be at least one of O and S. The halogen may be one selected from the group consisting of F, Cl, Br, and I, and may be F.

The element in Group 15 (nitrogen group) in the periodic table may be at least one of N and P, and may be N. The element in Group 14 (carbon group) in the periodic table may be C or Ge, and the element in Group 13 (boron group) in the periodic table may be at least one selected from the group consisting of B, Al, Ga and In or may be Ga.

The lithium-containing oxide may have a crystal structure such as a garnet type crystal structure, a perovskite type crystal structure, a lamellar rock salt type structure, a NASICON type crystal structure, a LISICON type crystal structure, or an olivine type crystal structure or may be amorphous. Particularly, a garnet type crystal structure, a perovskite type crystal structure, a lamellar rock salt type structure, a NASICON type crystal structure, a LISICON type crystal structure, or an olivine type crystal structure is preferable.

Examples of lithium-containing oxides having a garnet type crystal structure include $Li_7La_3Zr_2O_{12}$, $Li_5La_3Nb_2O_{12}$, and $Li_5BaLa_2TaO_{12}$, and garnet-like crystals in which some elements of these compounds are replaced with at least one element selected from the group consisting of N, F, Al, Sr, Sc, Nb, Ta, Sb, and lanthanoid elements can also be used as the lithium-containing oxide. Examples of lithium-containing oxides having a perovskite type crystal structure include $Li_{0.35}La_{0.55}TiO_3$, and $Li_{0.2}La_{0.27}NbO_3$, and perovskite-like crystals in which some elements of these compounds are replaced with at least one element selected from the group consisting of N, F, Al, Sr, Sc, Nb, Ta, Sb and lanthanoid elements can also be used as the lithium-containing oxide. Examples of lithium-containing oxides having a NASICON type crystal structure include $Li_{1.3}Ti_{1.7}Al_{0.3}(PO_4)_3$, $Li_{1.4}Al_{0.4}Ti_{1.6}(PO_4)_3$, and $Li_{1.4}Al_{0.4}Ti_{1.4}Ge_{0.2}(PO_4)_3$, and NASICON-like crystals in which some elements of these compounds are replaced with at least one selected from the group consisting of N, F, Al, Sr, Sc, Nb, Ta, Sb and lanthanoid elements can also be used as the lithium-containing oxide. Examples of lithium-containing oxides having LISICON type crystal include $Li_{14}ZnGe_4O_{16}$, and LiSICON-like crystals in which some elements of these compounds are replaced with at least one element selected from the group consisting of N, F, Al, Sr, Sc, Nb, Ta, Sb and lanthanoid elements can also be used as the lithium-containing oxide. The lithium-containing oxide may have other crystal structures such as $Li_{3.4}V_{0.6}Si_{0.4}O_4$, $Li_{3.6}V_{0.4}Ge_{0.6}O_4$, and $Li_{2+x}C_{1-x}B_xO_3$.

The lithium-containing oxide may be obtained by performing a solid-phase reaction using a compound containing various elements contained in the lithium-containing oxide as a raw material. Examples of raw materials include compounds containing Li as a lithium source, compounds containing La as a lanthanum source, compounds containing Zr as a zirconium source, and compounds containing Ga as a gallium source.

Examples of lithium sources include lithium metal salts such as lithium chloride, lithium nitrate, lithium acetate, lithium hydroxide, and lithium carbonate, and lithium alkoxides such as lithium methoxide. These raw materials may be used alone or two or more thereof may be used in combination.

Examples of lanthanum sources include lanthanum metal salts such as lanthanum chloride, lanthanum nitrate, and lanthanum acetate, and lanthanum alkoxides such as lanthanum trimethoxide. These raw materials may be used alone or two or more thereof may be used in combination.

Examples of zirconium sources include zirconium metal salts such as zirconium chloride, zirconium oxychloride, zirconium oxynitrate, zirconium oxyacetate, and zirconium acetate, and zirconium alkoxides such as zirconium tetramethoxide. These raw materials may be used alone or two or more thereof may be used in combination.

Examples of gallium compounds (gallium sources) include gallium metal salts such as gallium bromide, gallium chloride, gallium iodide, and gallium nitrate, and gallium alkoxides such as gallium trimethoxide. These raw materials may be used alone or two or more thereof may be used in combination.

The solid-phase reaction is performed by preparing a powder mixture of these main raw materials and then heating the mixture. The heating temperature is not particularly limited, and may be, for example, about 900 to 1,200° C.

The dopant is not particularly restricted as long as it is a compound containing the element to be introduced, and for example, a dopant having an anion containing the element to be introduced is preferable. The anion is preferably an anion containing one or more elements selected from the group consisting of a halogen, a chalcogen, nitrogen and phosphorus, more preferably a halide ion, and still more preferably a fluoride ion.

Examples of dopants containing fluoride ions include metal fluorides. The metal fluorides are not particularly limited, and examples thereof include alkali metal fluorides, alkaline earth metal fluorides, transition metal fluorides, and fluorides of metal elements in Group 13 in the periodic table. Examples of alkali metal fluorides include LiF, NaF, and KF. Examples of alkaline earth metal fluorides include $MgF_2$, $CaF_2$, $SrF_2$, and $BaF_2$, and $MgF_2$ is preferable. Examples of transition metal fluorides include fluorides of transition metals in the fourth period to the sixth period in the periodic table, and $NiF_2$ or $ZnF_2$ is preferable. Examples of fluorides of metal elements in Group 13 in the periodic table include $GaF_3$. The metal fluoride is preferably at least one of $GaF_3$, $MgF_2$, $NiF_2$ and $ZnF_2$. When a dopant containing fluoride ions is used, dopants containing other halide ions may not be used. For example, the content of other halogen atoms contained in the dopant with respect to 100 mol % of fluorine atoms contained in the dopant may be 150 mol % or less, 100 mol % or less, or 50 mol % or less.

The amount of the dopant used based on a total amount of 100 mass % of the dopant and the lithium-containing oxide is preferably 0.05 to 25 mass %, more preferably 0.1 to 20 mass %, and still more preferably 1 to 18 mass %.

A topotactic reaction may be performed by mixing and heating a lithium-containing oxide powder and a dopant powder. The topotactic reaction is preferably performed under a reduced pressure, and may be performed, for example, by putting a lithium-containing oxide powder and a dopant powder into a container such as a Pyrex (registered trademark) tube under a reduced pressure and heating the container. The lithium-containing oxide powder and the dopant powder may be used as a powder mixture or may be formed into a predetermined shape such as a pellet and then subjected to the topotactic reaction.

The obtained solid electrolyte may be a powder or may be used as a sintered product obtained by sintering a powder. The sintering method is not particularly limited, and sintering can be performed by a discharge plasma sintering method or the like.

The reason why a solid electrolyte having high ion conductivity (alkali ion conductivity) can be obtained by the method for preparing a solid electrolyte of the present disclosure is not necessarily clear, but the inventors speculated the reason as follows. First, as described in Patent Literature 1 to 7 and Non-Patent Literature 1 to 4, conventional solid electrolytes are synthesized by firing a lithium-containing oxide as a raw material and a compound containing the element to be doped together at a high temperature such as 1,000° ° C. when the element to be doped (for example, fluorine) is introduced (high-temperature solid-phase reaction). On the other hand, in the present embodiment, since the topotactic reaction is performed on the lithium-containing oxide synthesized in advance, the reaction proceeds gently while the basic framework of the lithium-containing oxide is maintained. Therefore, it is thought that a metastable phase, which cannot be obtained by a conventional high-temperature solid-phase reaction, can be obtained.

The shape of the solid electrolyte of the present embodiment is not particularly limited, and the electrolyte may be in the form of powder or shaped into a pellet form. In addition, the electrolyte may be a sintered product obtained by sintering powders or may be a bonded component obtained by binding powders with a binding agent. In addition, the electrolyte can be mixed with other components and used as a composition. Examples of such a composition include an electrolyte composition for use as a solid electrolyte in a battery such as a lithium ion battery and a power storage device such as a capacitor. The electrolyte composition may contain an ion-conducting material, an ion liquid, a polymer material and the like as components other than the solid electrolyte.

EXAMPLES

Example 1

First, 1.30 g of $Li_2CO_3$, 2.46 g of $La_2O_3$ and 1.24 g of $ZrO_2$ were mixed while being crushed. The obtained powder was sintered in air in an MgO crucible at 1,000° ° C. for 10 hours to obtain un-doped $Li_7La_3Zr_2O_{12}$ (LLZO).

$GaF_3$ in an amount of 10 mass % was added as a metal fluoride to the obtained LLZO with respect to 100 mass % of LLZO, and these were mixed while being crushing. The obtained powder was formed into pellets with a diameter of about 6 mm. The pellets were put into a Pyrex tube, the inside of the Pyrex tube was deaerated, and the tube was sealed. The pellets in the Pyrex tube were heated at 400° C. for 24 hours, and the pellets were then taken out and crushed to obtain a fluorine-doped LLZO powder (solid electrolyte).

<Measurement of Solid-State $^{19}$F-NMR>

Solid-state $^{19}$F-NMR measurement was performed on the solid electrolyte of Example 1 under the following conditions.

Device: JNM-ECZ600R (commercially available from JEOL Ltd.)
Observation nucleus: $^{19}F$ (564 MHz as a $^{19}F$ nucleus resonance frequency)
Magic angle spinning (MAS) frequency: 20 kHz
Measurement method: Hahn echo method
Waiting time and cumulative number of measurements: 15 seconds or 60 seconds, 128
Measurement temperature: room temperature
Reference substance: the chemical shift of the peak derived from the fluorine atom of the —$CF_2$—$CF_2$-unit of polytetrafluoroethylene was set to −122 ppm Here, regarding polytetrafluoroethylene, data measured separately from the sample under the same conditions as samples of examples and comparative examples was used as a reference (that is, it was used as an external standard).

As the PTFE, a sample obtained by cutting a tape seal (model number 20-E, commercially available from Valqua, Ltd.) into small pieces was used.

<Measurement of Solid-State $^6Li$-NMR>

Solid-state $^6Li$-NMR measurement was performed on the solid electrolyte of Example 1 under the following conditions.
Device: AVANCE300 (commercially available from Bruker)
Observation nucleus: $^6Li$ (44.1 MHz as a $^6Li$ nucleus resonance frequency)
Magic angle spinning (MAS) frequency: 10 kHz
Measurement method: single pulse method (using standard pulse sequence zg, commercially available from Bruker)
Excitation pulse width: π/4 pulse
Waiting time and cumulative number of measurements: 40 seconds, 2,048
Measurement temperature: room temperature
Reference substance: peak observed for a 1 mol/L LiCl aqueous solution was set to 1.19 ppm In the obtained solid-state $^6Li$-NMR spectrum, two peaks with larger intensity and smaller intensity were observed within a chemical shift range of −5 to 15 ppm. Here, for the area intensity of the larger peak, the area intensity was calculated by fitting the larger peak using the Gaussian least squares method.

In addition, for the area intensity of the smaller peak, the area intensity was calculated by performing fitting on the spectrum obtained by subtracting the large peak spectrum obtained by fitting using the above method from the original spectrum using the Gaussian least squares method. The peak with the larger area intensity was set as a first peak, and the peak with the smaller area intensity was set as a second peak. Table 1 shows the positions and half maximum full-widths of the first and second peaks.

In addition, Table 1 shows a ratio of the area intensity of the second peak to the sum of the area intensities of the first and second peaks (simply referred to as an area ratio).

In the solid-state $^{19}F$-NMR spectrum, one peak was observed within a chemical shift range of −100 to 50 ppm. Specifically, a peak was observed at a position of −24.1 ppm.

<Measurement of Powder x-Ray Diffraction>

The powder x-ray diffraction was measured using a device (UltimaIV, commercially available from Rigaku Corporation, radiation source: CuKα rays). In the powder X-ray diffraction chart of the solid electrolyte of Example 1, since a single peak was observed at a position of 2θ=16.0 to 17.0°, it was confirmed that the sample had a cubic garnet structure. In addition, it was confirmed that the un-doped LLZO had a tetragonal garnet structure.

In addition, in the powder X-ray diffraction chart, a peak was observed at 2θ=28.5 to 29.0°. A ratio of the intensity of the peak to the intensity of the peak at 16.0 to 17.0° (hereinafter simply referred to as a peak intensity ratio) was calculated. The results are shown in Table 1.

<ICP Emission Spectroscopy>

The solid electrolyte of Example 1 was subjected to ICP emission spectroscopy using a device (5110 ICP-AES, commercially available from Agilent Technologies), and content proportions of Li, La and Zr (when the content of La was 3) were determined. The analysis method was performed by pressure acid decomposition and the ICP-AES method. The pretreatment conditions were decomposition at 100° C. for 20 hours using a mixed acid mixture containing hydrochloric acid and sulfuric acid at a molar ratio of 3:1. The results are shown in Table 1.

<Measurement of Ion Conductivity>

The solid electrolyte of Example 1 was subjected to discharge plasma sintering using a device LABOX-325R (commercially available from SinterLand Inc.) under conditions of an application pressure of 40 MPa at 1,100° ° C. for 3 minutes in a vacuum to obtain a disk-shaped sintered product with a thickness of 0.5 mm and a diameter of 3 to 5 mm. A gold layer was formed on each of two circular surfaces of the sintered product which were opposite to each other by sputtering to obtain an evaluation test piece.

Measurement was performed at room temperature (25° C.) using an impedance analyzer (Sl1260, Sl1296, commercially available from Solartron) under conditions of a frequency of 0.1 to 1 MHz and an amplitude of 10 mV, the obtained Nyquist plot was fitted assuming an equivalent circuit, and the ion conductivity of the evaluation test piece was measured. The results are shown in Table 1.

Comparative Example 1

Various measurements were performed on the un-doped LLZO prepared in Example 1 in the same manner as in Example 1. The results are shown in Table 1 and Table 2. Here, as a result of powder x-ray diffraction measurement, since two split peaks were observed at a position of 16 to 17°, it was confirmed that the sample had a tetragonal garnet structure. In addition, the ion conductivity of a disk-shaped sintered product obtained by performing press molding and then firing in air at 1,000° ° C. for 10 hours was measured. Other results are shown in Tables 1 and 2.

Example 2

First, 1.16 g of $Li_2CO_3$, 2.37 g of $La_2O_3$. 1.17 g of $ZrO_2$, 0.12 g of $Ga_2O_3$, 0.07 g of $SrCO_3$, and 0.11 g of $Ta_2O_5$ were mixed while being crushed. The obtained powder was sintered in air in an MgO crucible at 1,000° ° C. for 10 hours to obtain $Li_{6.25}Ga_{0.25}La_{2.9}Sr_{0.1}Zr_{1.9}Ta_{0.1}O_{12}$.

$GaF_3$ in an amount of 1 mass % was added as a metal fluoride to the obtained $Li_{6.25}Ga_{0.25}La_{2.9}Sr_{0.1}Zr_{1.9}Ta_{0.1}O_{12}$ with respect to an amount of 100 mass % of $Li_{6.25}Ga_{0.25}La_{2.9}Sr_{0.1}Zr_{1.9}Ta_{0.1}O_{12}$ and these were mixed while being crushed. The obtained powder was formed into pellets with a diameter of about 6 mm. The pellets were put into a Pyrex tube, the inside of the Pyrex tube was deaerated, and the tube was sealed. The pellets in the Pyrex tube were heated at 400° C. for 24 hours, and the pellets were then taken out and crushed to obtain a fluorine-doped lithium-containing oxide powder (solid electrolyte). Various measurements were performed on the obtained solid electrolyte in the same manner as in Example 1. As a result of powder x-ray diffraction measurement, since a single peak was observed at a position of 16 to 17°, it was confirmed that the sample had a cubic garnet structure. In addition, it was confirmed that the $Li_{6.25}Ga_{0.25}La_{2.9}Sr_{0.1}Zr_{1.9}Ta_{0.1}O_{12}$ also had a cubic garnet structure. Other results are shown in Tables 1 and 2.

Example 3

First, 1.29 g of $Li_2CO_3$, 2.34 g of $La_2O_3$. 0.95 g of $ZrO_2$, and 0.42 g of $Ta_2O_5$ were mixed while being crushed. The obtained powder was sintered in air in an MgO crucible at 1,000° C. for 10 hours to obtain $Li_{6.6}La_3Zr_{1.6}Ta_{0.4}O_{12}$.

$MgF_2$ in an amount of 2 mass % was added as a metal fluoride to the obtained $Li_{6.6}La_3Zr_{1.6}Ta_{0.4}O_{12}$ with respect to an amount of 100 mass % of $Li_{6.6}La_3Zr_{1.6}Ta_{0.4}O_{12}$, and these were mixed while being crushed. The obtained powder was formed into pellets with a diameter of about 6 mm. The pellets were put into a Pyrex tube, the inside of the Pyrex tube was deaerated, and the tube was sealed. The pellets in the Pyrex tube were heated at 400° ° C. for 24 hours, and the pellets were then taken out and crushed to obtain a fluorine-doped lithium-containing oxide powder (solid electrolyte). Various measurements were performed on the obtained solid electrolyte in the same manner as in Example 1. As a result of powder x-ray diffraction measurement, since a single peak was observed at a position of 16 to 17°, it was confirmed that the sample had a cubic garnet structure. In addition, it was confirmed that the $Li_{6.6}La_3Zr_{1.6}Ta_{0.4}O_{12}$ also had a cubic garnet structure. Other results are shown in Tables 1 and 2.

Example 4

A solid electrolyte was synthesized in the same manner as in Example 1 except that $MgF_2$ was used as a metal fluoride and added in an amount of 20 mass % with respect to an amount of 100 mass % of LLZO, and various measurements were performed. The results are shown in Table 1 and Table 2.

Comparative Example 2

1.13 g of $Li_2CO_3$, 2.49 g of $La_2O_3$, 1.25 g of $ZrO_2$ and 0.13 g of LiF as raw materials were mixed, and sintered in air in an MgO crucible at 1,000° ° C. for 10 hours to obtain a solid electrolyte powder having a composition of $Li_6La_3Zr_2O_{11}F$. Such a solid electrolyte was prepared by the same method as in the lithium-containing oxide (particularly, Example 2, etc.) in PCT International Publication No. WO 2015/065879. The obtained solid electrolyte powder was subjected to discharge plasma sintering and various measurements in the same method as in Example 1. The results are shown in Table 1 and Table 2.

Comparative Example 3

$Li_{5.55}Ga_{0.5}La_{2.95}Ca_{0.05}Zr_2O_{11}F$ was synthesized by the same method as in Example 3 in Japanese Unexamined Patent Application Publication No. 2020-087770. That is, 0.87 g of $Li_2CO_3$, 2.48 g of $La_2O_3$, 1.27 g of $ZrO_2$, 0.24 g of $Ga_2O_3$, 0.02 g of $CaF_2$, and 0.12 g of LiF were mixed and sintered in air in an MgO crucible at 1,000° C. for 10 hours to obtain a solid electrolyte powder having a composition of $Li_{5.55}Ga_{0.5}La_{2.95}Ca_{0.05}Zr_2O_{11}F$. The ion conductivity of a disk-shaped sintered product obtained by performing press molding and then sintered in air at 1,000° C. for 10 hours was measured. The results are shown in Table 1 and Table 2.

TABLE 1

| | Composition (Li:La:Zr) | Crystal system | Peak intensity ratio | Ion conductivity ($10^{-5}$ S/cm) |
|---|---|---|---|---|
| Example 1 | 6.82:3.00:1.97 | cubic system | 0.047 | 4.7 |
| Example 2 | 6.56:3.00:2.02 | cubic system | 0.035 | 26 |
| Example 3 | 6.96:3.00:1.66 | cubic system | 0.098 | 5.7 |
| Example 4 | 8.85:3.00:2.04 | cubic system | 0.073 | 0.36 |
| Comparative Example 1 | 6.84:3.00:2.00 | tetragonal system | 0.065 | 0.011 |
| Comparative Example 2 | 6.63:3.00:2.00 | tetragonal system | 3.432 | 0.0039 |
| Comparative Example 3 | 4.38:3.00:2.09 | cubic system | 0.846 | 0.0033 |

TABLE 2

| | $^{19}$F-NMR peak position in range of −100 to 50 ppm (ppm) | $^6$Li-NMR peak position (ppm) | | $^6$Li-NMR peak half maximum full-width (ppm) | | Area intensity ratio (%) |
|---|---|---|---|---|---|---|
| | | First peak | Second peak | First peak | Second peak | |
| Example 1 | −24.1 | 2.40 | 1.41 | 1.45 | 0.92 | 9.9 |
| Example 2 | NT | 2.45 | 1.62 | 1.30 | 0.59 | 1.5 |
| Example 3 | −23.7 | 2.44 | 1.54 | 1.30 | 0.68 | 3.7 |
| Example 4 | −23.5 | 2.51 | 1.47 | 1.47 | 0.68 | 11.4 |
| Comparative Example 1 | — | 2.49 | not observed | 2.18 | not observed | — |
| Comparative Example 2 | not observed | 2.49 | 1.30 | 1.27 | 1.05 | — |
| Comparative Example 3 | not observed | 2.42 | not observed | 1.52 | not observed | — |

NT: not measured
NT: not measured

The solid electrolytes of Example 1 to 4 synthesized by the topotactic reaction all exhibited a higher ion conductivity than the solid electrolytes of Comparative Examples 1 to 3 obtained by high-temperature solid-phase synthesis. In addition, in the solid electrolytes of Example 1, Example 3, and Example 4, in the solid-state $^{19}$F-NMR spectrum, a peak was observed within a chemical shift range of −100 to 50 ppm, and in the solid-state $^6$Li-NMR spectrum, two peaks were observed within a chemical shift range of −5 to 15 ppm. On the other hand, in Comparative Example 3 synthesized by a conventional preparation method, in the solid-state $^{19}$F-NMR spectrum, no peak was observed within a chemical shift range of −100 to 50 ppm, and in the solid-state $^6$Li-NMR spectrum, only one peak was observed within a chemical shift range of −5 to 15 ppm. In addition, in Comparative Example 2 synthesized by a conventional preparation method, in the solid-state $^{19}$F-NMR spectrum, no peak was observed within a chemical shift range of −100 to 50 ppm, and in the solid-state $^6$Li-NMR spectrum, two peaks were observed within a chemical shift range of −5 to 15 ppm, but the crystal system was tetragonal. Accordingly, it has been found that in the solid electrolytes of Example 1, Example 3 and Example 4, an environment in which fluorine was present was different from conventional environments. In addition, comparing Examples 1 to 4 with Comparative Example 3, it has been found that an environment in which lithium remained in the cubic phase was different.

The invention claimed is:

1. A lithium-containing oxide having a cubic garnet structure,
   wherein, when a solid-state $^{19}$F-NMR spectrum is measured under conditions where a $^{19}$F nucleus resonance frequency is 564 MHz, at least one peak is observed within a chemical shift range of −100 to 50 ppm, based on a chemical shift of polytetrafluoroethylene being −122 ppm.

2. The lithium-containing oxide according to claim 1, wherein, when a solid-state $^{6}$Li-NMR spectrum is measured under conditions where a $^{6}$Li nucleus resonance frequency is 44.1 MHz, at least one peak is observed within a chemical shift range of −5 to 15 ppm, based on a chemical shift of a 1 mol/L LiCl aqueous solution being 1.19 ppm.

3. The lithium-containing oxide according to claim 1, wherein, regarding a ratio of the numbers of atoms measured through ICP emission spectroscopy, when La is 3, Li is 5 to 12, and Zr is 1 to 3.

4. The lithium-containing oxide according to claim 1, wherein, in a powder X-ray diffraction chart, a peak intensity at 28.5 to 29.0° to a peak intensity at 16.0 to 17.0° is 0.5 or less.

5. A sintered product comprising the lithium-containing oxide according to claim 1.

6. An electrolyte composition comprising the lithium-containing oxide according to claim 1.

* * * * *